US008612344B2

(12) United States Patent
Li et al.

(10) Patent No.: US 8,612,344 B2
(45) Date of Patent: Dec. 17, 2013

(54) ONLINE PROCESSING FOR OFFSHORE BUSINESS TRANSACTIONS

(75) Inventors: Shanfa Li, Hangzhou (CN); Leiming Yuan, Hangzhou (CN); Jinbo Xia, Hangzhou (CN); Fengping Wu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 237 days.

(21) Appl. No.: 12/600,797

(22) PCT Filed: Aug. 21, 2009

(86) PCT No.: PCT/US2009/054637
§ 371 (c)(1),
(2), (4) Date: Nov. 18, 2009

(87) PCT Pub. No.: WO2010/022344
PCT Pub. Date: Feb. 25, 2010

(65) Prior Publication Data
US 2011/0231283 A1     Sep. 22, 2011

(30) Foreign Application Priority Data

Aug. 21, 2008   (CN) .......................... 2008 1 0130988

(51) Int. Cl.
*G06Q 40/00* (2012.01)
*G06Q 20/04* (2012.01)
(52) U.S. Cl.
CPC ................................... *G06Q 20/04* (2013.01)
USPC .......................................................... 705/39
(58) Field of Classification Search
USPC ............... 705/40, 35, 39, 41, 26, 37; 726/26; 235/379; 709/224; 345/173
See application file for complete search history.

(56) References Cited

U.S. PATENT DOCUMENTS

| 6,205,433 | B1 * | 3/2001 | Boesch et al. ............... 705/27.1 |
| 6,598,028 | B1 | 7/2003 | Sullivan et al. |
| 2001/0034682 | A1 | 10/2001 | Knight et al. |
| 2002/0055907 | A1 | 5/2002 | Pater et al. |
| 2002/0062278 | A1 | 5/2002 | Ingram et al. |
| 2002/0087454 | A1 | 7/2002 | Calo et al. |
| 2002/0087455 | A1 | 7/2002 | Tsagarakis et al. |
| 2002/0101967 | A1 * | 8/2002 | Eng et al. .................. 379/114.01 |
| 2002/0161707 | A1 * | 10/2002 | Cole et al. ........................ 705/42 |
| 2002/0174031 | A1 | 11/2002 | Weiss |
| 2003/0028451 | A1 * | 2/2003 | Ananian ......................... 705/27 |
| 2003/0061170 | A1 * | 3/2003 | Uzo ................................ 705/64 |
| 2003/0069831 | A1 | 4/2003 | Le et al. |
| 2003/0208440 | A1 | 11/2003 | Harada et al. |
| 2004/0267666 | A1 | 12/2004 | Minami et al. |
| 2005/0004872 | A1 | 1/2005 | Gavin et al. |

(Continued)

*Primary Examiner* — Tien Nguyen
(74) *Attorney, Agent, or Firm* — Lee & Hayes, PLLC (57) ABSTRACT

A method and system for processing offshore online transaction use an intermediary platform to conduct foreign currency exchange on behalf of a buyer and an offshore seller. The method allows the buyer to purchase a product of an offshore merchant website using a local currency through the intermediary platform. The buyer places an order at the offshore merchant website, which sends an order request to the intermediary platform. The intermediary platform calculates the purchase amount in local currency, and exchanges the local currency amount provided by the user into an equivalent foreign currency amount through a financial platform, and sends a transaction message indicating successful payment to the offshore merchant website to allow shipping of the product. The intermediary platform periodically conducts accounting and profit sharing operations with the offshore merchant website.

20 Claims, 5 Drawing Sheets

(56) References Cited

U.S. PATENT DOCUMENTS

| | | |
|---|---|---|
| 2005/0021366 A1 | 1/2005 | Pool et al. |
| 2005/0021454 A1 | 1/2005 | Karpovich et al. |
| 2005/0177464 A1* | 8/2005 | Komem et al. ............ 705/27 |
| 2006/0015452 A1* | 1/2006 | Kulasooriya et al. ....... 705/39 |
| 2006/0136301 A1* | 6/2006 | Grovit ......................... 705/16 |
| 2006/0287953 A1 | 12/2006 | Chauhan |
| 2007/0073629 A1* | 3/2007 | Montero et al. ............ 705/74 |
| 2007/0100711 A1 | 5/2007 | Stroh |
| 2008/0103935 A1 | 5/2008 | Pulnikova |
| 2008/0120129 A1 | 5/2008 | Seubert et al. |
| 2008/0162305 A1 | 7/2008 | Rousso et al. |
| 2008/0249908 A1* | 10/2008 | Lorberg et al. ............ 705/35 |
| 2008/0270246 A1 | 10/2008 | Chen |

\* cited by examiner

ONLINE PROCESSING FOR OFFSHORE BUSINESS TRANSACTIONS

RELATED APPLICATIONS

This application is a national stage application of international patent application PCT/US09/54637 filed Aug. 21, 2009, entitled "ONLINE PROCESSING FOR OFFSHORE BUSINESS TRANSACTIONS", which claims priority from Chinese patent application, Application No. 200810130988.8, filed Aug. 21, 2008, entitled "ONLINE PROCESSING FOR OFFSHORE BUSINESS TRANSACTIONS", which applications are hereby incorporated in their entirety by reference.

TECHNICAL FIELD

The present disclosure relates to the fields of online transaction, and particularly to methods and systems for online transaction processing for offshore transactions.

BACKGROUND

Along with the development of the Internet and maturity of encryption technologies such as digital signature, electronic commerce has been expanding globally at a tremendous pace. Many successful companies have grown up using electronic commerce as the primary method of business operation. The new business methods developed in context of e-commerce have completely revolutionized the existing business mode.

Figure 1:
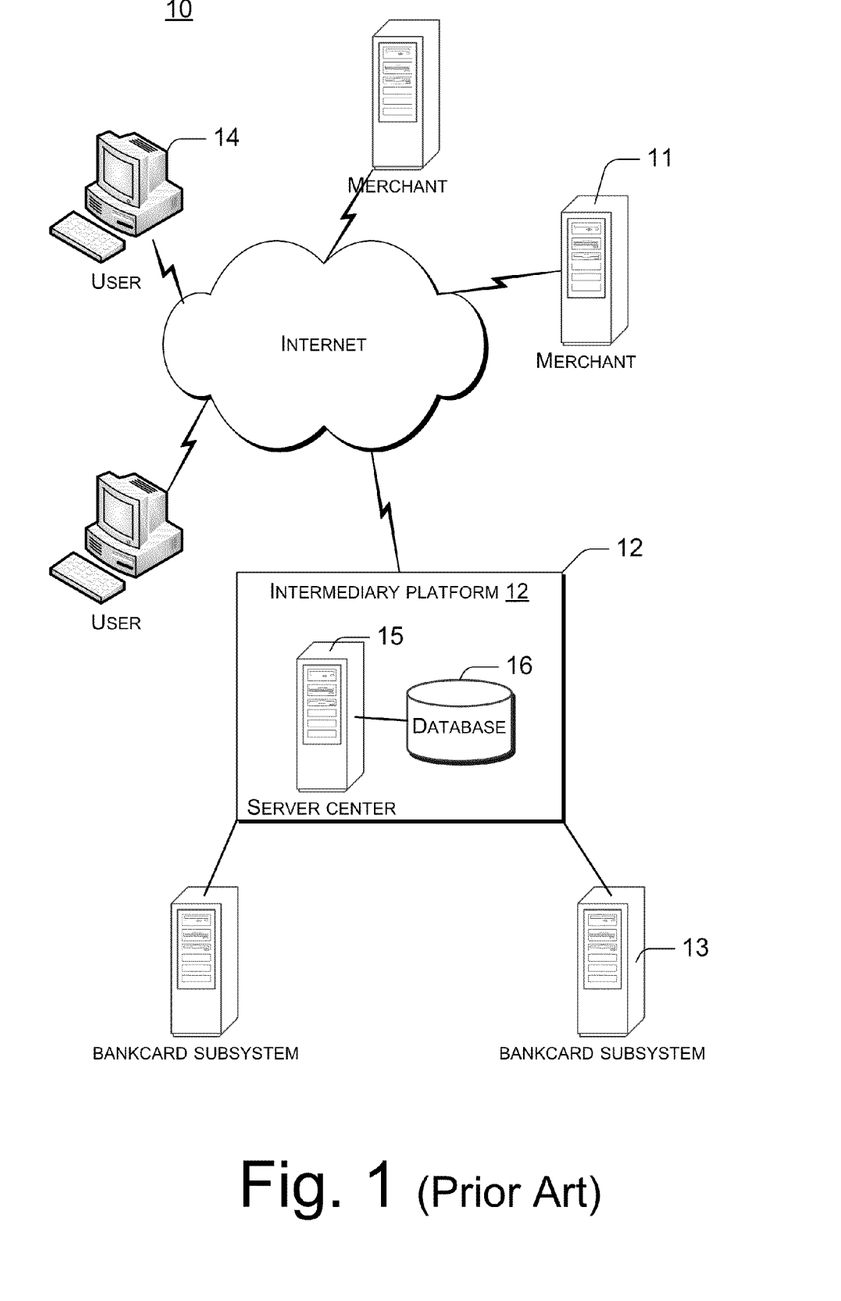
FIG. 1 shows a schematic structural diagram of an existing generic online transaction system.

FIG. 1 shows a schematic structural diagram of a generic example of an existing online transaction system 10. The system 10 includes merchant 11, intermediary platform 12, bankcard subsystem 13, and user 14. User 14 purchases a product of merchant 11, and makes an online payment using bankcard subsystem 13. Merchant 11 ships the product to user 14. Merchant 11 and bankcard subsystem 13 conduct account reconciliation and account remittance on a regular basis. Functions that are achieved by bankcard subsystem 13 may be integrated into intermediary platform 12.

AliPay is an example of intermediary platform 12. User 14 may open an account with AliPay, and deposit a certain amount of fund into the account through direct deposit or recharging method. If user 14 purchases a product of merchant 11, a deduction from the account is processed through AliPay. This method only requires merchant 11 to complete account reconciliation and account remittance with AliPay on a regular basis.

Intermediary transaction platform 12 may have a server center 15 and a database 16. The server center 15 is used for processing order requests, while the database 16 is used for recording each transaction in real time. Merchant 11 and bankcard subsystem 13 may check business orders regularly by visiting the database 22.

In the above transaction pattern, merchant 11 and user 14 (typically a buyer) usually reside in the same country or use the same credit system. For the purpose of illustration, if user 14 resides in China and wants to purchase a product of an online offshore merchant, the existing mode of transaction usually involves the following:

User 14 first logs in a website of an online offshore merchant 11 and submits an order request. The order request may include transaction information such as the name of the product to be purchased, price, payment method, user information including mailing address.

User 14 then exchanges RMB into a currency (US dollars, for example) accepted by the online merchant 11 at a foreign exchange service, and transfers or mail the right amount of foreign currency to an account appointed by merchant 11. Upon receiving the mail money, the online merchant 11 ships the product. If user 14 already has a sufficient amount of the required foreign currency, user 14 may send the money directly without using a foreign exchange service.

Alternatively, instead of sending the fund directly into the online merchant 11's account, user 14 may send the fund to an offshore intermediary platform such as AliPay to improve the transaction's security.

The above transaction pattern has several deficiencies. First, the buyer is required to have sufficient amount of required currency to buy an offshore product. This may incur inconvenience to buyers, especially to users in countries where obtaining foreign currency and making an international fund transfer is difficult and often restricted. As a result, the existing mode of transaction does not allow an easy online purchase of offshore products. Ideally, a buyer should not have to pay a visit to a special foreign exchange service in order to buy something online from a foreign country.

Moreover, the buyer is required to calculate an equivalent amount of local currency (e.g., RMB) to exchange for the foreign currency (e.g., US dollars). As foreign exchange rates reported by real time quote systems of different foreign exchange institutions may be different, the buyer may need to compare foreign exchange rates of various institutions in order to get a better rate in each purchase of offshore product. This may further cause inconvenience to the buyer. In many instances, a buyer may give up on purchasing a product.

Other issues that exist include the inability to directly evaluate the credibility of the merchant, the inability to assess the quality of the product, difficulties in making the return and getting a refund, and the long purchasing and shipping process.

SUMMARY

Disclosed are a method and a system for processing offshore online transaction using an intermediary platform to conduct foreign currency exchange on behalf of a buyer and an offshore seller. The method allows the buyer to purchase a product of an offshore merchant website using a local currency through the intermediary platform. The buyer places an order at the offshore merchant website, which sends an order request to the intermediary platform. The intermediary platform calculates the purchase amount in local currency, and exchanges the local currency amount provided by the user into an equivalent foreign currency amount through a financial platform, and sends a transaction message indicating successful payment to the offshore merchant website to allow shipping of the product. The intermediary platform periodically conducts accounting and profit sharing operations with the offshore merchant website.

The intermediary platform may either receive the order request directly from the offshore merchant website or via an offshore intermediary platform having a business relationship with the intermediary platform.

In one embodiment, intermediary platform has access to a financial account of the user having a deposit of funds in local currency. The financial account of the user may be located within the intermediary platform. The account of the offshore merchant website may also be located within the intermediary platform. The user and the merchant may open these accounts when registering with the intermediary platform.

The foreign currency exchange between the intermediary platform and the financial platform may either be conducted separately for each order or conducted with a batch process for multiple orders on a scheduled periodical basis. Transferring the amount of payment in the required currency to an account of the offshore merchant website may either be conducted for each order or as a part of a regular account settlement between the intermediary platform and offshore merchant website.

The intermediary platform may receive foreign exchange rate information from a foreign exchange service and calculate the equivalent local currency amount based on the received foreign exchange rate information. The foreign exchange service may either be a separate service or a part of the financial platform.

Also disclosed is an intermediary platform for processing offshore online transactions. The intermediary platform includes a computer server center programmed to perform the acts in the process of offshore online transactions disclosed herein. The intermediary platform is connected to the user, the offshore merchant website, and the financial platform through the Internet. The intermediary platform also has a database storing the financial account of the user and the financial account of the offshore merchant website.

Compared with existing technologies, the disclosed method and system allow a user to complete an offshore purchase order without having to visit a foreign exchange service. The disclosed intermediary platform also improves the security of offshore business transactions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The exemplary embodiments of the present disclosure are described in detail using accompanying figures.

In the presence disclosure, a "module" or a "unit" in general refers to a functionality designed to perform a particular task or function. A module or a unit can be a piece of hardware, software, a plan or scheme, or a combination thereof, for effectuating a purpose associated with the particular task or function. In addition, delineation of separate units does not necessarily suggest that physically separate devices are used. Instead, the delineation may be only functional, not structural, and the functions of several units may be performed by a single combined device or component. When used in a computer-based system, regular computer components such as a processor, a storage and memory may be programmed to function as one or more units or devices to perform the various respective functions.

Figure 2:
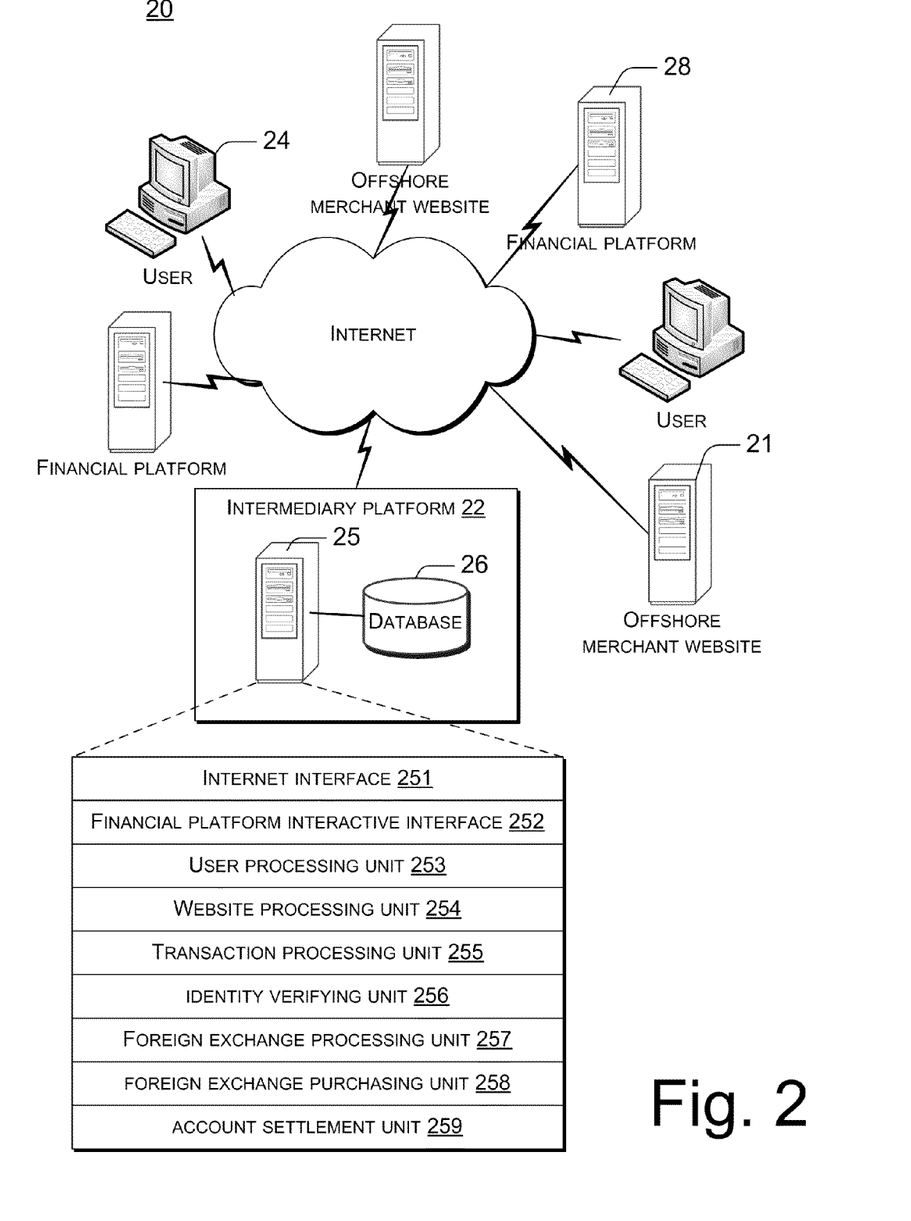
FIG. 2 shows a schematic structural diagram of a first exemplary environment for processing online transactions in accordance with the present disclosure.

FIG. 2 shows a schematic diagram illustrating a first exemplary environment 20 for processing online transaction. The environment 20 includes user 24 (buyer), intermediary platform 22, offshore merchant website 21, and financial platform 28. It is noted that user 24 offshore merchant website 21 are only representative. There may be multiple users and websites involved in the environment 20. In addition, multiple financial platforms like financial platform 28 may be a part of the environment 20.

Intermediary platform 22 includes at least a server center 25 and a database 26 storing various data. Intermediary platform 22 enables user 24 to purchase an offshore product of offshore merchant website 21 using a local currency. Intermediary platform 22 may be owned by a financial institution, or by a third party which has signed agreement with a financial institution. An example of such intermediary platform 22 is AliPay. Intermediary platform 22 connects with offshore merchant website 21 and financial platform 28, and is adapted for receiving an order request from offshore merchant website 21. Upon receiving the request, intermediary platform 22 calculates an amount of local currency equivalent to the foreign currency amount involved in a present transaction based on exchange rate information obtained from financial platform 28. Intermediary platform 22 then exchanges for the needed foreign currency using the calculated amount of local currency, and sends a transaction message indicating successful payment to offshore merchant website 21.

Offshore merchant website 21 can be any website providing services or products to be purchased to user 24. The products may be such tangible things as toys and clothes, or can be something intangible such as online games. Upon receiving an order of a product submitted by user 24, offshore merchant website 21 sends an order request to intermediary platform 22. The order request may include at least buyer information, product information, purchase amount in foreign currency and the type of currency. Upon receiving a transaction message indicating payment has been successfully made, offshore merchant website 21 schedules to ship the product to user 24.

Financial platform 28 can be any system that provides information about exchange rates of foreign currencies. Financial platform 28 may further conduct selling and buying of foreign currencies. One example of financial platform 28 is a foreign exchange trading system of a financial institution. Financial platform 28 provides exchange rate information of foreign currencies to intermediary platform 22, and conducts a requested foreign exchange upon receiving a request from intermediary platform 22.

It is appreciated that FIG. 2 shows the method at a conceptual level for illustration only. Various ways may be used to implement the method and the intended functions. For example, in one embodiment, financial platform 28 is part of intermediary platform 22. Intermediary platform 22 calls financial platform 28 to provide the current exchange rate of the foreign currency whenever such information is needed. In another embodiment, financial platform 28 is a separate system but is connected to intermediary platform 22 to provide exchange rate information, and to sell and buy foreign currencies upon request by intermediary platform 22. Financial platform 28 may either be owned by the same owner of intermediary platform 22, or by a different party (e.g., a financial institution such as a bank). In one embodiment, financial platform 28 belongs to a separate system connected to intermediary platform 22 to provide exchange rate information to intermediary platform 22. In yet another embodiment, intermediary platform 22 and financial platform 28 may together constitute an independent system providing centralized foreign exchange service to multiple websites including offshore merchant website 21.

Server center 25 may include various components and units to achieve various functions. As shown in FIG. 2, service and 25 includes an Internet interface 251, a financial platform interactive interface 252, a user processing unit 253, a website processing unit 254, a transaction processing unit 255, an identity verifying unit 256, a foreign exchange processing unit 257, a foreign exchange purchasing unit 258, and an account processing unit 259.

The Internet interface 251 is adapted for establishing interaction between an Internet user 24 and offshore merchant website 21. The financial platform interactive interface 152 is adapted for establishing data communication with each financial platform 28. The user processing unit 253 is adapted for receiving registration of user 24, modifying the user information, saving information of each transaction (order) of user 24, and saving personal information and transaction information of user 24 into the database 26. The website processing unit 254 is adapted for receiving and saving merchant information such as contract information, transaction information and billing information of each offshore merchant website 21. The transaction processing unit 255 is adapted for processing each offshore order request. The identity verifying unit 256 is adapted for verifying identity of user 24 for each offshore transaction. The foreign exchange processing unit 257 is adapted for obtaining a current exchange rate from a foreign exchange quote system of financial platform 28 periodically, and for saving the current exchange rates. The foreign exchange processing unit 257 also calculates an equivalent amount of local currency required for exchanging the foreign currency amount involved with each offshore transaction according to the exchange rate information. The foreign exchange purchasing unit 258 is connected with a foreign exchange offering system of financial platform 28 to exchange the local currency amount into the foreign currency amount. The account processing unit 259 is adapted for conducting billing and account settlement operations (e.g., account clearing, reconciliation etc.) with each offshore merchant website 21.

Internet interface 251 and financial platform interactive interface 252 may be communication interfaces. User processing unit 253, website processing unit 254, transaction processing unit 255, identity verifying unit 256, foreign exchange processing unit 257, foreign exchange purchasing unit 258, and account processing unit 259 may be logical units and be implemented by a processor.

Intermediary platform 22 may connect with an identity verification system to verify identity of user 24. One example of identity verification is an identification card verification system of Ministry of Public Security of China, which verifies the user identity using an identification card number entered by the cardholder. The identification card number and name of the user (user 24) entered are compared with information stored in (or accessible by) the identification card verification system. If the identification card number and the name of the user are consistent with the information stored in the identification card verification system, the identity of the user is verified. Otherwise, identity verification has failed. A digital certificate may further be used to improve the security of identity verification.

Intermediary platform 22 is connected to foreign exchange vending systems and foreign exchange quote systems of financial platform 28 in order to calculate an equivalent local currency amount for exchanging the required foreign currency amount, and to process a foreign exchange purchase. Financial platform 28 may also connect with organizations or agencies which govern or administer foreign exchange activities and monitor the foreign exchange purchases of user like user 24. One example of such organizations or agencies is State Administration of Foreign Exchange in China. Financial platform 28 may also connect with offshore financial platforms to allow intermediary platform 22 to transfer foreign currency to an offshore financial platform designated by offshore merchant website 21. It is noted that Intermediary platform 22 may connect with multiple financial platforms like financial platform 28.

Figure 3:
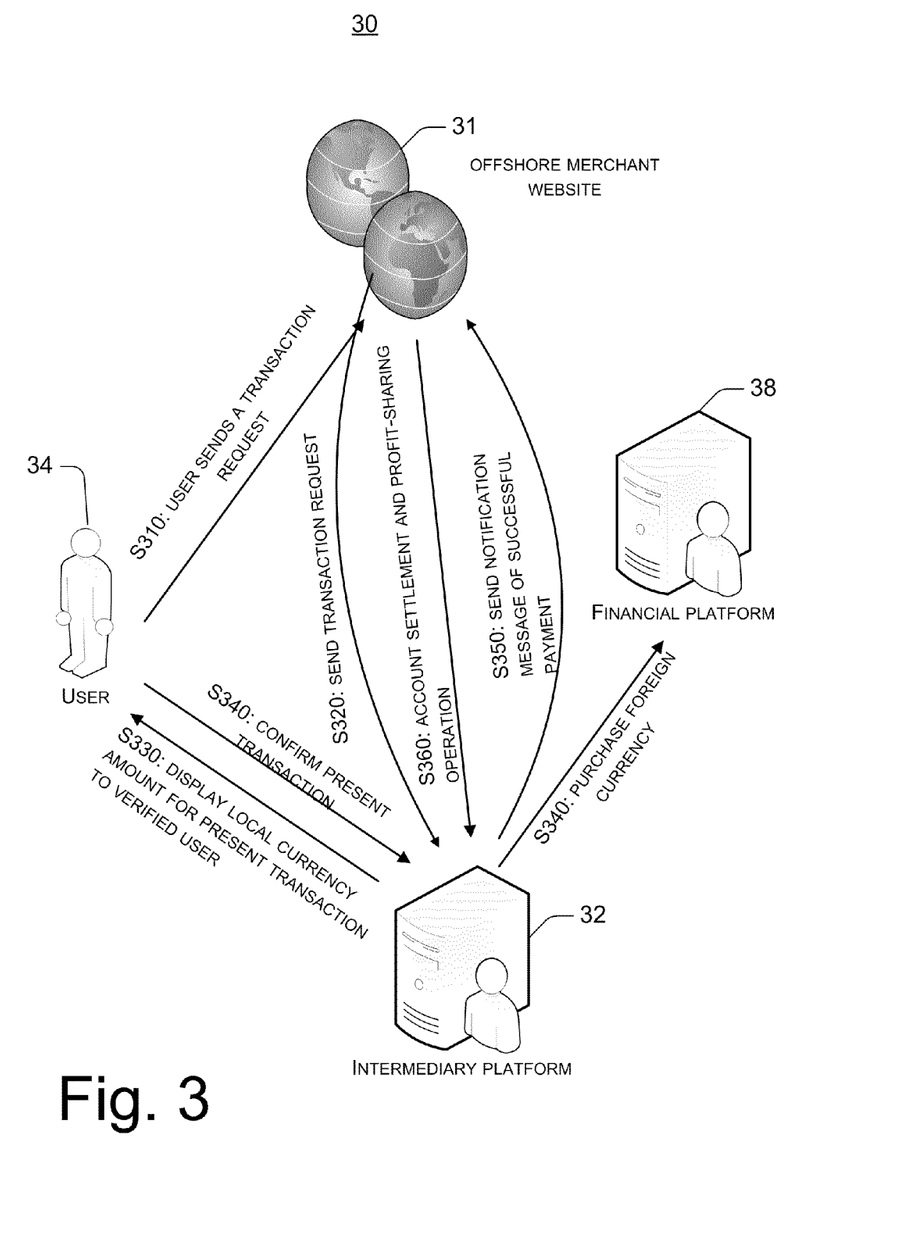
FIG. 3 shows an architectural data flow diagram of a first exemplary method for processing online transactions in accordance with the present disclosure.

FIG. 3 shows an architectural data flow diagram of a first exemplary method 30 for processing online transactions in accordance with the present disclosure. The method 30 uses the online transaction processing system disclosed herein. The method 30 allows a user to purchase a product of an offshore merchant website using a local currency. This is accomplished using an intermediary platform disclosed herein. The method 30 is described as follows. In this description, the order in which a process is described is not intended to be construed as a limitation, and any number of the described process blocks may be combined in any order to implement the method, or an alternate method.

At S310, user 34 logs in a contracted offshore merchant website 31, and submits a purchase order indicating a product of interest. User 34 is a registered user of intermediary platform 32, and is usually non-anonymous. Intermediary platform 32 may verify the identity of user 34 during login. For example, intermediary platform 32 may verify an identification card number and the name of the holder entered by user 34. If the identification card number and the name entered are consistent with information maintained by an identification card authority, verification is successful. Otherwise, subsequent operations may be denied. Intermediary platform 32 may also perform other types of identity verification to user 34.

Intermediary platform 32 may require user 34 to enter the identification card information when user 34 registers with intermediary platform 32. Intermediary platform 32 may first verify the received identification card information with the identification card authority. If identity is successfully verified, registration of user 34 is granted. Otherwise, registration may be denied. Subsequent user login may not require further identity verification for user 34. Alternatively, because of the possibility of identification card forging, owner's name of a paying bank account used may be required to be consistent with the name of user 34's identification card. The registration for offshore transaction may be denied if the names are inconsistent. However, because user 34 may make a payment through means other than using a bank account, this type of identity verification has certain limitations. Alternatively, the identity of a user conducting offshore transaction may be verified at the time of login or during the purchasing process. Above examples are only used for illustration purpose, and should not be construed as a limitation to the present disclosure.

Before user 34 can log in offshore merchant website 31 and browse products for purchase, offshore merchant website 31 needs to first establish a business relationship (e.g., signing a contract) with intermediary platform 32. The two parties decide upon the contract terms such as the percentage of profit sharing and account settlement method. Offshore merchant website 31 may designate a bank (e.g., financial platform 38) for processing foreign exchanges, and determine how often accounting procedure is performed with intermediary platform 32. Intermediary platform 32 may also have its own choices of financial platform 38 for processing foreign exchange others.

At block S320, offshore merchant website 31 sends an order request to intermediary platform 32. The order request includes buyer (user 34) information, product information, purchase amount in foreign currency, and the type of currency for payment. In order to do this, offshore merchant website 31 creates the order request upon receiving from user 34 a purchase order including product and quantity to be purchased.

At S330, intermediary platform 32 receives the order request, and calculates the purchase amount in local currency based on foreign exchange rate obtained from financial platform 38. Intermediary platform 32 may then display the local currency amount for this transaction to user 34 for review and confirmation.

In the present exemplary embodiment, intermediary platform 32 may obtain foreign exchange rates from financial platform 38 on a periodical basis. In practice, intermediary platform 32 may communicate with multiple financial platforms like financial platform 38 to obtain various foreign exchange rates. Examples of foreign exchange rates that may be obtained are exchange rate between RMB and YEN, exchange rate between RMB and US dollar, and exchange rate between RMB and EURO. Upon receiving the order request, intermediary platform 32 obtains the type of currency for payment and the associated amount from the request.

In one embodiment, intermediary platform 32 finds a relevant exchange rate at financial platform 38 designated by offshore merchant website 31. In another embodiment, intermediary platform 32 may compare exchange rates reported by various financial platforms 38.

The identity verification of user 34 and other types of verification may be performed in block S330.

At S340, after receiving a payment confirmation of user 34, intermediary platform 32 exchanges the local currency amount in the account of user 34 into the equivalent foreign currency amount using financial platform 38.

In this block (S340), a process of the following steps may take place.

A1: When intermediary platform 32 sends the transaction information such as the purchase amount in the foreign currency to user 34, user 34 may be further required to confirm whether he or she wants to make this purchase. If yes, the process continues to the next step A2. Otherwise, the process terminates, and a transaction result is returned to offshore merchant website 31.

A2: Upon receiving a payment confirmation of user 34, intermediary platform 32 determines whether user 34 has an account on intermediary platform 32. If user 34 has an account on intermediary platform 32, intermediary platform 32 determines whether the account has enough funds for the present transaction. If yes, the process proceeds to the next step A3. Otherwise, intermediary platform 32 instructs user 34 to open an account, recharge an existing account or provide alternative payment method to pay for the present amount.

A3: Intermediary platform 32 exchanges the proper amount of the local currency of user 34 into the required amount of the foreign currency through financial platform 38. The local currency may be withdrawn from an account held by user 34 on intermediary platform 32, or provided by another payment method selected by user 34. In one embodiment, intermediary platform 32 makes a foreign exchange purchase each time when an order requiring the foreign exchange purchase is processed. In another embodiment, considering that it may be burdensome for intermediary platform 32 to make a foreign exchange purchase for every order, an amount of the local currency in user 34's account may first be kept and set aside. Intermediary platform 32 may then exchange a combined local currency amount which has been accumulated a preset period of time into respective foreign currencies in a batch process. The back process may use the same or different financial platforms 38 for each exchange amount corresponding to an accumulated order. For example, there may be fifty transactions (orders) which require foreign exchange with Bank of China and one hundred transactions which require foreign exchange would Construction Bank in a certain day. Intermediary platform 32 may then complete foreign exchange purchases in these banks in batch processing before the banks are closed.

One example of intermediary platform 32 is the intermediary payment system AliPay. AliPay initiates a request of foreign exchange purchase was a bank such as Bank of China. The bank then performs the actual foreign exchange purchases and processes the purchases in the name of each individual user who buys offshore products. This foreign exchange process may take into consideration of each user's foreign exchange limit imposed on the user by regulations. The bank may subsequently notify AliPay upon completion of the foreign exchange purchases.

In one embodiment, intermediary platform 32 may limit the maximum foreign exchange purchase value of user 34. For instance, if the foreign exchange purchase amount of user 34 in a single transaction is greater than a preset value, or if the cumulative foreign exchange purchase amount of user 34 accumulated in the present year is greater than a preset value, intermediary platform 32 may notify user 34 that its foreign exchange purchase has exceeded the prescribed limit. Intermediary platform 32 may then terminate the transaction, and return a message of transaction termination to offshore merchant website 31.

At S350, intermediary platform 32 transfers the amount of payment in the required foreign currency to an account of offshore merchant website 31, and upon transfer, sends a transaction message indicating successful payment to offshore merchant website 31, which will then ship the product.

Intermediary platform 32 has access to a financial account of the offshore merchant website for the purpose of transferring the funds. In one embodiment, the financial account of the offshore business is located within intermediary platform 32. Such an account may be opened by the merchant owner of the offshore merchant website by registering with intermediary platform 32.

If a payment has been successfully made, offshore merchant website 31 may ship the product. Offshore merchant website 31 may directly ship the product to a shipping address submitted to the website by user 34. Alternatively, offshore merchant website 31 may log into a user processing unit of intermediary platform 32 to obtain user information such as user 34's name and user 34's contact method, and ship the product upon confirmation by user 34.

At S360, intermediary platform 32 periodically conducts accounting and profit sharing operations with offshore merchant website 31. Accounting operations may include regular account checking, account settlement, account balancing and account reconciliation.

If a request of refund processing is received from user 34 or offshore merchant website 31, intermediary platform 32 determines if the request satisfies a preset requirement. If satisfied, intermediary platform 32 exchanges the foreign currency into the local currency through financial platform 38, deposits the refund into the account of user 34, and sends a refund processing result to user 34 and offshore merchant website 31.

In one embodiment, intermediary platform 32 saves information of each offshore transaction for future references. Intermediary platform 32 may receive inquiries from user and offshore merchant website 31 and return a feedback to the inquiring party based on the save the information. Transaction details contained in a user inquiry may include the type of currency for payment, the price of offshore product and the name of the product.

Intermediary platform 32 may directly connect with offshore merchant website 31 directly. Alternatively, intermediary platform 32 may connect with offshore merchant website 30 1 via an offshore intermediary platform. Intermediary platform 32 may also connect with both offshore merchant websites and offshore intermediary platforms. In the following, an exemplary embodiment is described to illustrate the process of completing an offshore transaction through connecting with an offshore intermediary platform.

Figure 4:
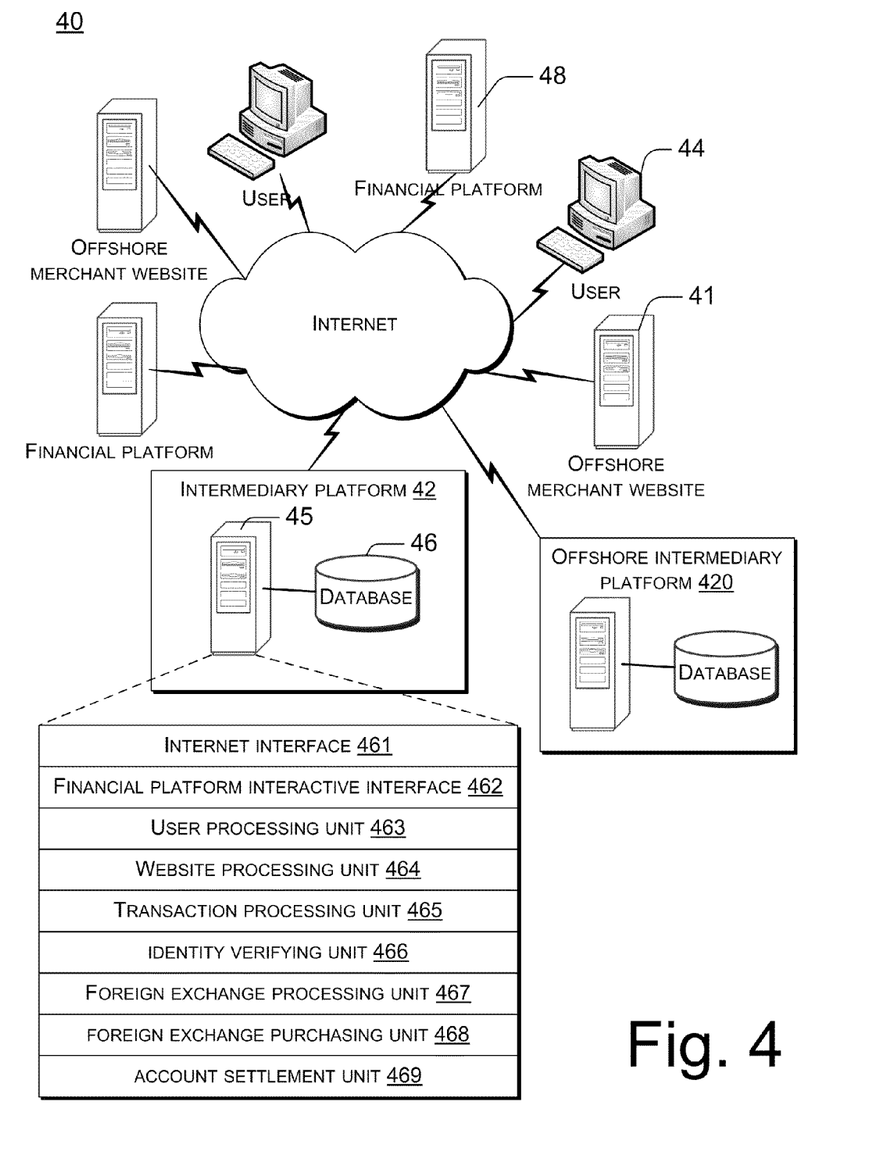
FIG. 4 shows a schematic structural diagram of a second exemplary environment for processing online transactions in accordance with the present disclosure.

FIG. 4 shows a schematic structural diagram of a second exemplary environment 40 for offshore transaction. The environment 40 includes one or more users 41, intermediary platform 42, one or more offshore merchant websites 41, an offshore intermediary platform 420 connecting with some or all of the offshore merchant websites 41, and one or more financial platforms 48. Each user 44, offshore merchant website 41, offshore intermediary platform 420, and financial platform 48 connects a server center 45 and a database 46 storing various data.

The server center 45 may include an Internet interface 461, a financial platform interactive interface 462, a user processing unit 463, a website processing unit 464, a transaction processing unit 465, an identity verifying unit 466, a foreign exchange processing unit 467, a foreign exchange purchasing unit 468, and an account processing unit 469. These units are adapted for performing functions similar to the corresponding units of FIG. 2.

The offshore intermediary platform 420 is similar to intermediary platform 42 and is used for completing operations such as interaction and account settlement with intermediary platform 42. The offshore intermediary platform 420 is used for providing operations such as interaction and account settlement with the offshore merchant website 41.

Figure 5:
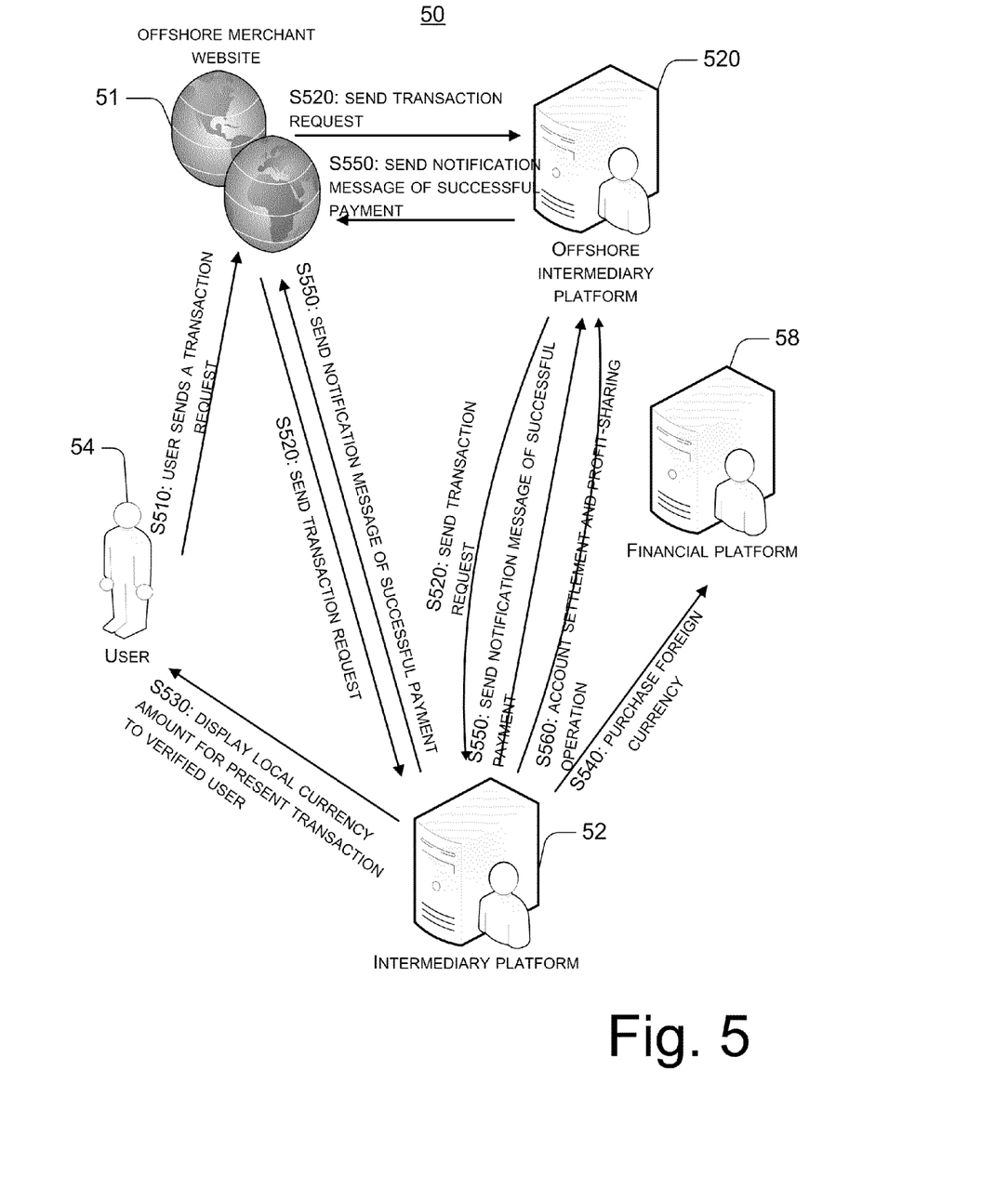
FIG. 5 shows an architectural data flow diagram of a second exemplary method for processing online transactions in accordance with the present disclosure.

FIG. 5 shows an architectural data flow diagram of a second exemplary method 50 for processing online transactions in accordance with the present disclosure. The method 50 allows a user to purchase a product of an offshore merchant website using a local currency through an intermediary platform and an offshore intermediary platform. The method 50 is described as follows.

At S510, user 54 logs in offshore merchant website 51, and submits a purchase order to offshore merchant website 51. Offshore intermediary platform 520 is connected with offshore merchant website 51 and has signed a contract with intermediary platform 52.

At S520, offshore merchant website 51 sends an order request to intermediary platform 52 through offshore intermediary platform 520. The order request includes user (buyer) information, product information, purchase amount in foreign currency, and the type of currency for payment.

At S530, intermediary platform 52 receives the order request, and calculates the purchase amount in local currency based on a foreign exchange rate obtained from financial platform 58. Intermediary platform 52 may then display the local currency amount for this transaction to user 54 for review and confirmation.

At S540, after receiving a payment confirmation of user 54, intermediary platform 52 exchanges the local currency amount held in an account of user 54 into required foreign currency through financial platform 58.

At S550, intermediary platform 52 transfers the amount of payment in the required foreign currency to an account of offshore merchant website 51, and upon transfer, sends through the offshore intermediary platform 520 a transaction message indicating successful payment to offshore merchant website 51, which will then ship the product.

At S560, intermediary platform 52 periodically conducts accounting and profit sharing operations with offshore intermediary platform 520. Alternatively, intermediary platform 52 may directly complete accounting and profit sharing operations with offshore merchant website 51 periodically.

The above second exemplary embodiment of the online transaction is similar to the first exemplary embodiment of the online transaction described with reference to FIG. 3. The primary difference is that in the second exemplary online transaction intermediary platform 52 interacts with offshore merchant website 51 indirectly through offshore intermediary platform 520. Instead of signing a contract directly with each offshore merchant website 51, intermediary platform 52 signs a contract with offshore intermediary platform 520. Moreover, intermediary platform 52 conducts accounting and profit sharing operations with offshore intermediary platform 520, which in turn may conduct accounting and profit sharing operations with each contracted offshore merchant website such as offshore merchant website 51. How the offshore intermediary platform connects and performs operations such as accounting and profit sharing with the offshore merchant website is not a consideration of this exemplary online transaction. Alternatively, intermediary platform 52 may directly perform accounting operation with each individual offshore merchant website 51, regardless of how offshore intermediary platform 520 conducts its own accounting operation with offshore merchant website 51.

It is appreciated that intermediary platform 52 may separately sign contracts with offshore merchant websites 51 and offshore intermediary platform 520 without affecting the offshore online transaction itself.

The disclosed method and system allow a user (e.g., a buyer) to complete an offshore online transaction without having to visit a foreign exchange service or agency such as a bank to make a foreign exchange purchase and a foreign currency remittance. The user further does not need to be concerned of the conditions of offshore merchant website. The disclosed method and system allow the user to use local currency to make a purchase of an offshore product with convenience and security. From a merchant's perspective, the disclosed method may help improve the rate of successful transactions.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   under a control of one or more processors:
   receiving at an intermediary platform an order request from an offshore merchant website, the order request containing information of a user desiring to buy a product sold by the offshore merchant website, information of the product, an amount of payment and a required currency for payment;

comparing multiple foreign exchange rates between the required currency and a local currency from a plurality of sources to determine a designated foreign exchange rate from the multiple foreign exchange rates;

conducting a foreign currency exchange between the intermediary platform and a financial platform to exchange an equivalent local currency amount into the amount of payment in the required currency based on the designated foreign exchange rate;

transferring the amount of payment in the required currency to an account of the offshore merchant website; and sending a notification message indicating successful payment to the offshore merchant website to allow the offshore merchant website to ship the product to the user.

2. The method as recited in claim 1, wherein the order request from the offshore merchant website is received via an offshore intermediary platform having a business relationship with the intermediary platform.

3. The method as recited in claim 1, wherein the intermediary platform has access to a financial account of the user having a deposit of funds in local currency.

4. The method as recited in claim 3, wherein the financial account of the user is located within the intermediary platform.

5. The method as recited in claim 1, the account of the offshore merchant website is located within the intermediary platform.

6. The method as recited in claim 1, wherein the foreign currency exchange between the intermediary platform and the financial platform is conducted with a batch process.

7. The method as recited in claim 1, wherein the transferring the amount of payment in the required currency to the account of the offshore merchant website is conducted as a part of a regular account settlement between the intermediary platform and the offshore merchant website.

8. The method as recited in claim 1, further comprising:
receiving at the intermediary platform foreign exchange rate information from a foreign exchange service; and
calculating the equivalent local currency amount based on the received foreign exchange rate information.

9. The method as recited in claim 8, wherein the foreign exchange service is a part of the financial platform.

10. The method as recited in claim 1, wherein the offshore merchant website performs an accounting settlement with the intermediary platform on a regular basis for a purpose of account balancing and profit sharing.

11. The method as recited in claim 1, further comprising:
verifying the user's identity at the intermediary platform.

12. The method as recited in claim 1, further comprising:
sending information of the foreign currency exchange to the user to be reviewed by the user.

13. The method as recited in claim 1, further comprising:
checking if conducting the foreign currency exchange between the intermediary platform and the financial platform would break a maximum limit of foreign exchange imposed on the user.

14. The method as recited in claim 1, the method further comprising:
receiving a request for refund from the user or the offshore merchant website;
exchanging a refund amount in the foreign currency into the local currency through the financial platform; and
depositing the refund amount in the local currency into the user's account.

15. An intermediary platform for processing offshore online transactions, the intermediary platform comprising a computer server center programmed to perform actions comprising:

receiving at the intermediary platform an order request from an offshore merchant website, the order request containing information of a user desiring to buy a product sold by the offshore merchant website, information of the product, an amount of payment and a required currency for payment;

receiving a unique identification number entered by the user;

verifying an identity of the user by verifying the unique identification number;

conducting a foreign currency exchange between the intermediary platform and a financial platform to exchange an equivalent local currency amount into the amount of payment in the required currency;

transferring the amount of payment in the required currency to a financial account of the offshore merchant website; and sending a notification message indicating successful payment to the offshore merchant website to allow the offshore merchant website to ship the product to the user.

16. The intermediary platform as recited in claim 15, the intermediary transaction platform is connected to the user, the offshore merchant website, and the financial platform through the Internet.

17. The intermediary platform as recited in claim 15, comprising a database storing a financial account of the user and the financial account of the offshore merchant website.

18. The intermediary platform as recited in claim 15, wherein the unique identification number is an identification card number and the verifying the unique identification number entered by the user comprises checking whether the identification card number and a name of the user are consistent with information stored in an identification card verification system.

19. The intermediary platform as recited in claim 15, further comprising receiving a result of monitoring from a supervising agency that monitors a purchase of foreign currency.

20. A memory having stored thereon computer-executable instructions executable by one or more processors that, when executed by the one or more processors, cause the one or more processors to perform actions comprising:

receiving at an intermediary platform an order request from an offshore merchant website, the order request containing information of a user desiring to buy a product sold by the offshore merchant website, information of the product, an amount of payment and a required currency for payment;

verifying an identity of the user by comparing an identification card number and a name of the user with information stored in an identification card verification system;

comparing foreign exchange rates from a plurality of sources to determine a designated foreign exchange rate;

determining a preset time for a batch processing of foreign exchange transactions;

waiting to conduct a foreign currency exchange between the intermediary platform and a financial platform to exchange an equivalent local currency amount into the amount of payment in the required currency based on the designated foreign exchange rate until the preset time arrives;

transferring the amount of payment in the required currency to an account of the offshore merchant website; and sending a notification message indicating successful payment to the offshore merchant website to allow the offshore merchant website to ship the product to the user.

* * * * *